(12) United States Patent
Fiorese et al.

(10) Patent No.: US 10,907,663 B2
(45) Date of Patent: Feb. 2, 2021

(54) GAS CYLINDER ACTUATOR WITH OVERTRAVEL INDICATOR DEVICE

(71) Applicant: SPECIAL SPRINGS S.R.L., Romano d'Ezzelino (IT)

(72) Inventors: Massimo Fiorese, Bassano del Grappa (IT); Daniel Fantinato, Bassano del Grappa (IT); Roberto Rech, Nove (IT)

(73) Assignee: SPECIAL SPRINGS S.R.L., Romano d'Ezzelino (IT)

( * ) Notice: Subject to any disclaimer, the term of this patent is extended or adjusted under 35 U.S.C. 154(b) by 0 days.

(21) Appl. No.: 15/467,182

(22) Filed: Mar. 23, 2017

(65) Prior Publication Data

US 2017/0276153 A1 Sep. 28, 2017

(30) Foreign Application Priority Data

Mar. 24, 2016 (IT) .................... 102016000030722

(51) Int. Cl.
*F15B 15/28* (2006.01)
*F16F 9/02* (2006.01)
*F15B 15/14* (2006.01)

(52) U.S. Cl.
CPC .......... *F15B 15/2807* (2013.01); *F15B 15/14* (2013.01); *F16F 9/0218* (2013.01); *F16F 2230/0047* (2013.01); *F16F 2230/24* (2013.01)

(58) Field of Classification Search
CPC ...... F16F 9/0218; F15B 15/14; F15B 15/2807
See application file for complete search history.

(56) References Cited

U.S. PATENT DOCUMENTS

2017/0051807 A1* 2/2017 Fetibegovic .......... F16F 9/0218

FOREIGN PATENT DOCUMENTS

| CN | 103291684 A | 9/2013 |
|---|---|---|
| CN | 105317904 A | 2/2016 |
| EP | 2406520 A1 | 1/2012 |
| EP | 2634451 A1 | 9/2013 |
| EP | 2 644 294 A1 | 10/2013 |

(Continued)

OTHER PUBLICATIONS

Chinese Office Action dated Mar. 31, 2020 received in Chinese Patent Application No. 201710165029.9.

(Continued)

*Primary Examiner* — Abiy Teka
(74) *Attorney, Agent, or Firm* — Scully, Scott, Murphy & Presser, P.C.

(57) ABSTRACT

A gas cylinder actuator with overtravel indicator device, which includes a tubular containment jacket, an end face, an opposite annular guiding portion, a stem-piston arranged so as to pass through the annular guiding portion, wherein the stem-piston protrudes from the jacket in an axial direction, a chamber for pressurized gas being defined between the tubular jacket, the end face, the annular guiding portion for the stem-piston, an indicator device for indicating that overtravel for the stem-piston has occurred; and an annular body, which is inserted partially into a corresponding seat between the jacket and an annular portion so as to surround the outer lateral surface of an end portion of the annular guiding portion; the annular body rests in an axial direction on an element that protrudes radially within the jacket and is integral with the jacket.

7 Claims, 3 Drawing Sheets

(56) References Cited

FOREIGN PATENT DOCUMENTS

| EP | 2980438 A1 | 2/2016 |
|----|------------|--------|
| KR | 10 1057 8820 B1 | 12/2015 |
| WO | WO 2010/102994 A1 | 9/2010 |
| WO | 2015/193187 A1 | 12/2015 |

OTHER PUBLICATIONS

Chinese Office Action dated Oct. 21, 2019 received in Chinese Patent Application No. 201710165029.9.
Indian Examination Report dated Aug. 24, 2020 received in Indian Patent Application No. 201734008207, together with an English-language translation.

* cited by examiner

GAS CYLINDER ACTUATOR WITH OVERTRAVEL INDICATOR DEVICE

The present invention relates to a gas cylinder actuator with overtravel indicator device.

Gas cylinder actuators are generally defined by a tubular gas containment jacket, which is closed hermetically at one end by an end face provided with a valve for charging with gas, and at the other end by a head portion, which is perforated for the passage of a stem with a piston, which translates inside the jacket; the jacket, the end face and the head portion define the travel space for the piston, while the piston itself, with the jacket and the end face, defines the gas compression and expansion chamber.

Such gas cylinder actuators are typically, but not exclusively, also used in situations, such as in the use of mold dies, mold presses, and the like, in which they can be subjected to situations of high internal pressure or of impact with the associated parts of a press or of a mold die, such that they are susceptible of being damaged; such damage can render the gas cylinder actuator unusable, making replacement necessary and entailing the shutdown of the machine or plant in which it is deployed to operate, but such damage can also be such as to cause harm to an operator who happens to be in the vicinity, such as in the event of an explosion owing to an uncontrolled increase in the pressure, or in the event of an explosion owing to damage of the stem-piston or of the parts that retain it inside the jacket, or in the event of breakage with uncontrolled outflow of pressurized gas.

One of the foremost reasons that lead to such damage is what is known as 'overtravel' of the piston, i.e. a retracting stroke of the stem-piston which is greater than the permitted stroke which that specific gas cylinder actuator is built to handle.

Such 'overtravel' can be caused for example by an unexpected increase of travel on the rod of the actuator, which forces the rod to re-enter the body of the actuator for a length not foreseen, thus generating an 'overtravel' which cannot be supported by the overall structure of the actuator.

The actuator can thus bulge or split open, or it can break at the points where the parts that compose it are joined together, or the sealing elements can yield; in all these cases the result can be an unexpected, unwanted, and dangerous rapid outflow of gas.

In order to prevent such dangerous overtravel situations from happening, gas cylinder actuators have been developed which comprise safety devices that are adapted for the controlled outflow, in safety, of the pressurized gas in the event of overtravel.

Such a gas cylinder actuator is disclosed and claimed, for example, in EP2406520 in the name of this same applicant.

Such gas cylinder actuator with overtravel safety device comprises a tubular gas containment jacket, which is hermetically closed at one end by an end face and at the other end by a head portion, which is perforated for the passage of a stem with a piston; the jacket, the end face and the piston define the gas compression and expansion chamber; the gas cylinder actuator is characterized in that it has, on the inner face of the jacket, in the compression chamber, at least one region in low relief which is designed to break the seal provided by the sealing means which are associated either with the piston with the head portion, and which operate against the inner face of the jacket; such low relief region is provided in a position that is such as to define the limit of the return stroke of said piston or of said head portion.

Such gas cylinder actuator with overtravel device, although it works very well and is widely appreciated on the market, has an aspect that can be improved, linked to the visibility of the fact that the overtravel device has come into play.

In fact, if an overtravel situation has occurred, the actuator may appear to be in perfectly good condition, but part of the gas has escaped in a controlled manner and as a consequence the operation of the actuator is no longer what is expected of it.

The outflow of gas from the actuator, owing to the intervention of the safety device against the overtravel of the stem-piston, cannot be perceived and the poor operation of a partially discharged gas cylinder actuator will be evident only when a product that is output from a die or from a press in which such a gas cylinder actuator is deployed fails to meet the design specifications.

The aim of the present invention is therefore to provide a gas cylinder actuator with overtravel indicator device that is capable of overcoming the above mentioned limitation of conventional gas cylinder actuators.

Within this aim, an object of the invention is to provide a gas cylinder actuator in which it can be clearly perceived that the overtravel safety device has worked.

Another object of the invention is to provide a gas cylinder actuator which enables a user to rapidly restore to full efficiency a die or other machine in which the gas cylinder actuator is deployed.

Another object of the invention is to provide a gas cylinder actuator the functionality of which is not lower than conventional gas cylinder actuators.

This aim and these and other objects which will become better evident hereinafter are achieved by a gas cylinder actuator with overtravel indicator device according to claim 1.

Further characteristics and advantages of the invention will become better apparent from the description of four preferred, but not exclusive, embodiments of the gas cylinder actuator according to the invention, which are illustrated for the purposes of non-limiting example in the accompanying drawings wherein.

Figure 1:
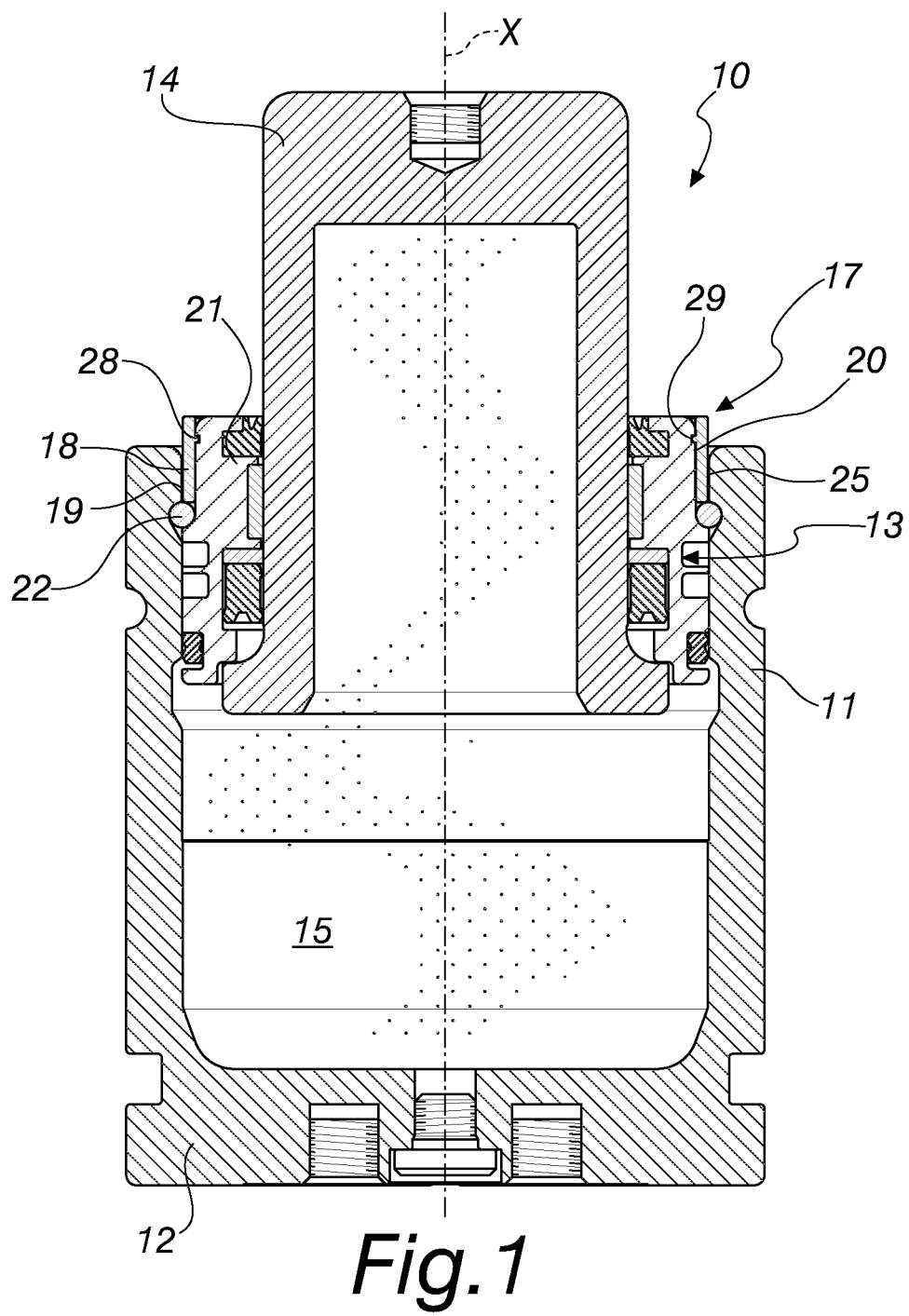
FIG. 1 is a cross-sectional side view of a gas cylinder actuator according to the invention in a first embodiment thereof.

With reference to the figures, a gas cylinder actuator with overtravel indicator device according to the invention is generally designated in the first embodiment thereof with the reference numeral 10.

The gas cylinder actuator 10 comprises:
a tubular containment jacket 11,
an end face 12,
an opposite annular guiding portion 13 for a stem-piston 14, which protrudes from the jacket 11 in an axial direction X, a stem-piston 14 arranged so as to pass through the annular portion 13, a chamber 15 for pressurized gas is defined between the tubular jacket, the end face, the annular passage portion for a stem-piston, and the stem-piston, a device 17 for indicating that overtravel for the stem-piston 14 has occurred.

The indicator device 17 comprises an annular body 18, partially inserted into a corresponding seat 19 between the jacket 11 and the annular portion 13 so as to surround the outer lateral surface 20 of an end portion 21 of the annular portion 13.

The annular body 18 is resting in an axial direction X on an element 22, described in more detail below, that protrudes radially within the jacket 11 and is integral with the jacket 11.

The annular body 18 is cylindrical and is contoured to remain within the cylindrical space occupation 23 defined between the outer lateral surface 20 of the end portion 21 of the annular guiding portion 13 and the extension 24 in an axial direction X of the inner surface 25 of the jacket 11 that surrounds the outer lateral surface 20.

In particular, the annular body 18 is made of a material that is plastically deformable, or deformable and breakable, or breakable without plastic deformation.

The gas cylinder actuator 10 comprises also extraction-preventing means that are preset to prevent the exit of the annular body 18 from its seat 19.

Figure 2:
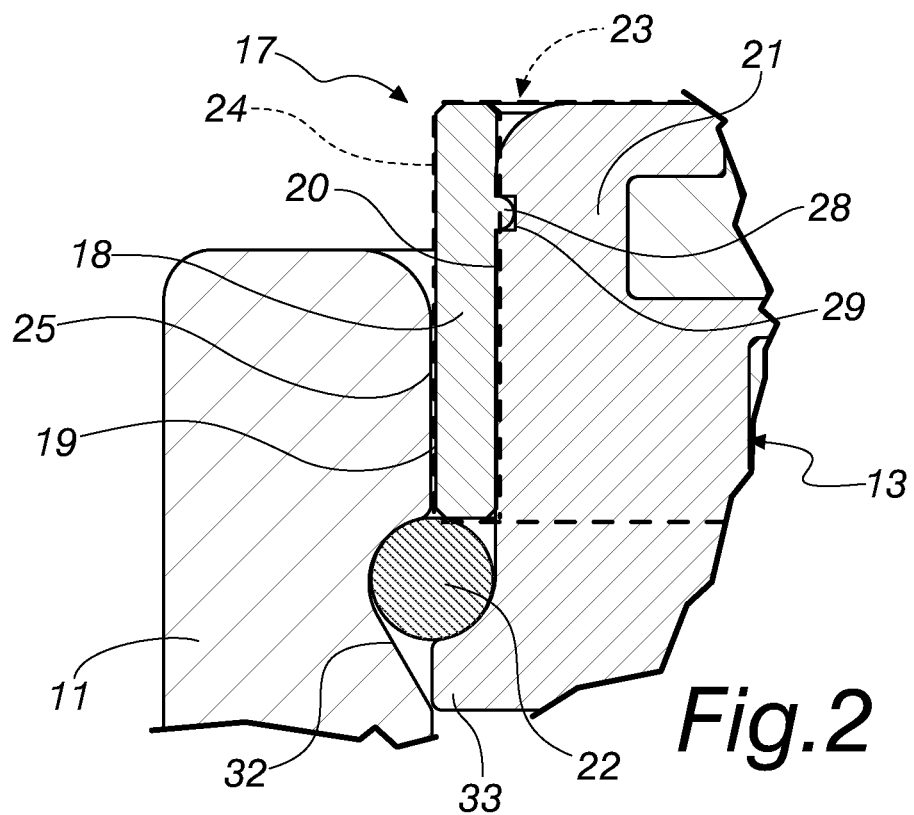
FIG. 2 is a detail of FIG. 1.
Figure 3:
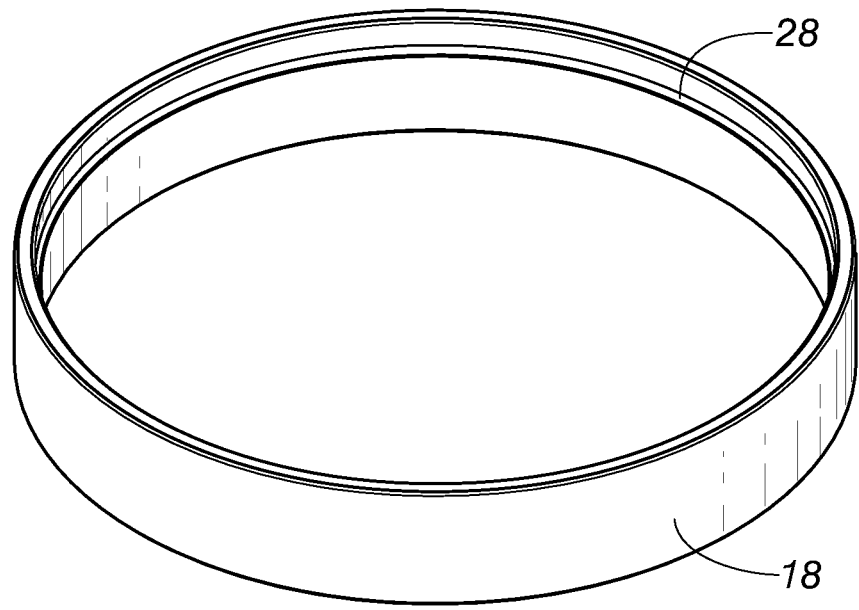
FIG. 3 shows an element of the overtravel indicator device.

In the first embodiment, the extraction-preventing means comprise an inner perimetric radial protrusion 28 that protrudes from the annular body 18 and is inserted into a corresponding outer perimetric seat 29 defined on the outer lateral surface 20 of the annular guiding portion 13, as in FIG. 2.

Figure 4:
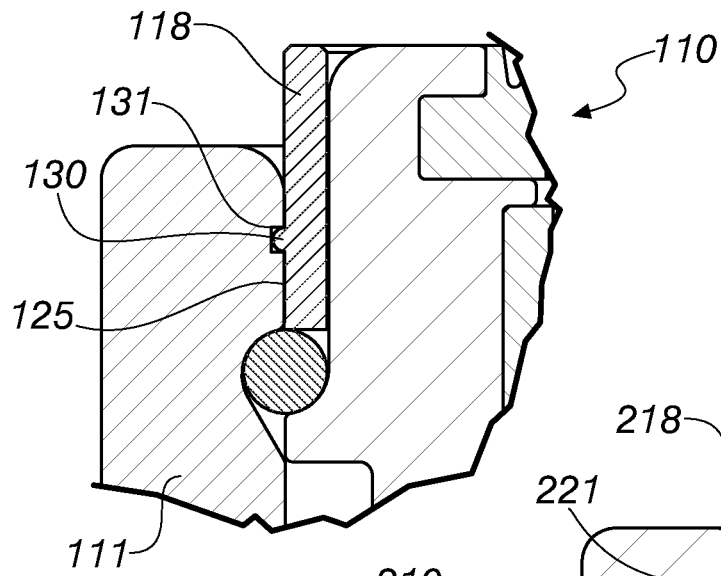
FIG. 4 is a cross-sectional side view of a detail of a gas cylinder actuator according to the invention in a second embodiment thereof.

In a second embodiment of the gas cylinder actuator according to the invention, designated in FIG. 4 with the reference numeral 110, the extraction-preventing means comprise an outer perimetric radial protrusion 130 that protrudes from the annular body 118 and is inserted into a corresponding inner perimetric seat 131 defined on the inner lateral surface 125 of the jacket 111.

Figure 5:
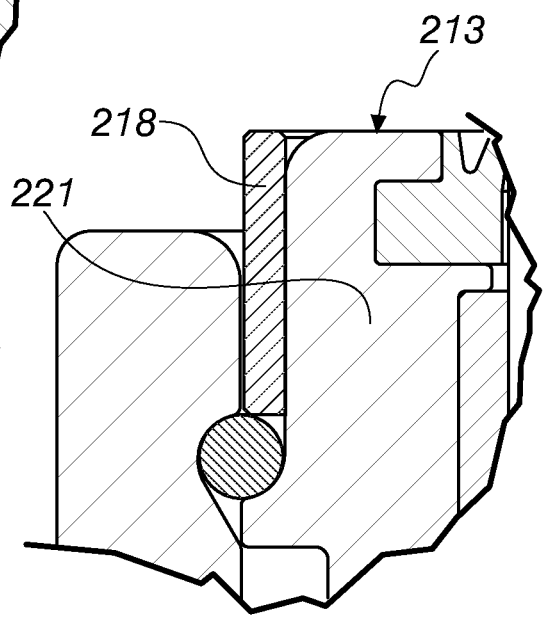
FIG. 5 is a cross-sectional side view of a detail of a gas cylinder actuator according to the invention in a third embodiment thereof.

In a third embodiment of the invention, designated in FIG. 5 with the reference numeral 210, the annular body 218 is fitted with interference over the end portion 221 of the annular guiding portion 213.

Figure 6:
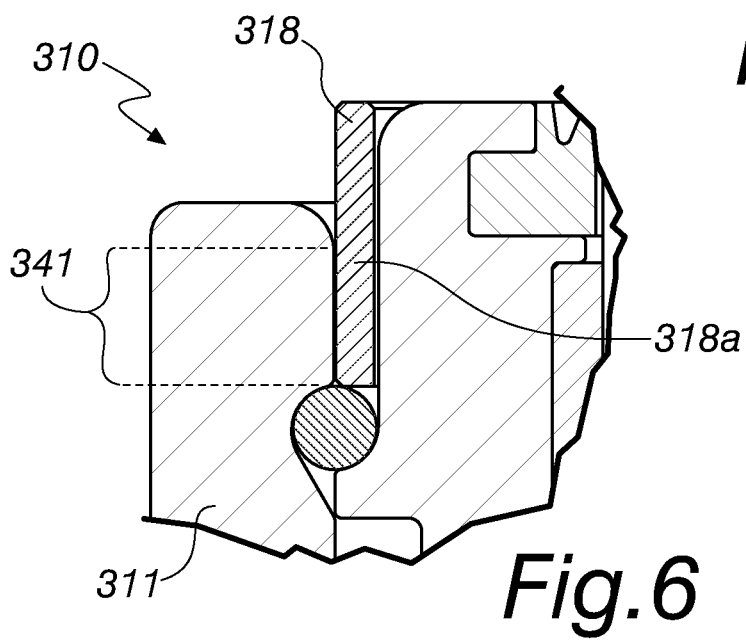
FIG. 6 is a cross-sectional side view of a detail of a gas cylinder actuator according to the invention in a fourth embodiment thereof.

In a fourth embodiment of the invention, designated in FIG. 6 with the reference numeral 310, the annular body 318 is coupled to the jacket by way of insertion with interference of a part 318a thereof into an end portion 341 of the jacket 311.

The element 22 that protrudes radially within the jacket 11 and is integral with the jacket 11 is constituted by an extraction-preventing ring, which has a first part thereof inside a seat 32 defined on the inner surface 25 of the jacket 11 and a second part thereof that protrudes radially toward the inside of the jacket 11 and abuts against an extraction-preventing shoulder 33 of the guiding portion 13.

When an overtravel situation occurs, for example owing to the sliding of a press, the annular guiding portion 13 enters to the jacket 11 at least partially, while the annular body 18, which rests on the element 22, is crushed or fractured; the plastic deformation or the breakage of such annular body 18 clearly highlights that an overtravel situation has occurred.

In practice it has been found that the invention fully achieves the intended aim and objects.

In particular, with the invention a gas cylinder actuator has been devised in which, by virtue of the overtravel indicator device, it can clearly be seen that the overtravel safety device has worked.

Such gas cylinder actuator 10 makes it possible for a user to rapidly restore to full efficiency a die or other press machine in which the gas cylinder actuator is deployed, by replacing the gas cylinder actuator.

With the invention a gas cylinder actuator has been devised the functionality of which is not lower than conventional gas cylinder actuators.

The invention, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102016000030722 (UA2016A001965) from which this application claims priority are incorporated herein by reference.

What is claimed is:

1. A gas cylinder actuator with overtravel indicator device, comprising:
   a tubular containment jacket,
   an end face,
   an opposite annular guiding portion,
   a stem-piston arranged so as to pass through said annular guiding portion, wherein said stem-piston protrudes from said jacket in an axial direction,
   a chamber for pressurized gas being defined between said tubular jacket, said end face, said annular guiding portion for said stem-piston,
   an indicator device for indicating that overtravel for said stem-piston has occurred, wherein said indicator device comprises an annular body, which, in a non-overtravel position, is inserted partially into a corresponding seat between said jacket and an annular portion so as to surround an outer lateral surface of an end portion of said annular guiding portion, said annular body resting in an axial direction on an element that protrudes radially within the jacket and is integral with said jacket, wherein said annular body is cylindrical and is contoured to remain within a cylindrical space occupation defined between the outer lateral surface of the end portion of said annular guiding portion and an extension in an axial direction of an inner surface of said jacket that surrounds said outer lateral surface, wherein the annular portion comprises an upper surface and a lower surface, wherein the lower surface is nearer to the end face than the upper surface, and wherein in an overtravel position the upper surface of the annular portion is within the jacket, and the annular body is deformed and broken or broken without plastic deformation.

2. The gas cylinder actuator according to claim 1, further comprising extraction-preventing means that are preset to prevent the exit of said annular body from its seat.

3. The gas cylinder actuator according to claim 2, wherein said extraction-preventing means comprise an inner perimetric radial protrusion that protrudes from said annular body and is inserted into a corresponding outer perimetric seat defined on the outer lateral surface of said annular guiding portion.

4. The gas cylinder actuator according to claim 2, wherein said extraction-preventing, means comprise an outer perimetric radial protrusion that protrudes from said annular body and is inserted into a corresponding inner perimetric seat defined on an inner lateral surface of said jacket.

5. The gas cylinder actuator according to claim 1, wherein said annular body is fitted with interference over said end portion of said annular guiding portion.

6. The gas cylinder actuator according to claim 1, wherein the annular body is coupled to the jacket by way of insertion with interference of a part thereof into an end portion of said jacket.

7. The gas cylinder actuator according to claim 1, wherein said element that protrudes radially within the jacket and is integral with said jacket is constituted by an extraction-preventing ring, which has a first part thereof inside a seat defined on the inner surface of the jacket and a second part thereof that protrudes radially toward the inside of said jacket and abuts against an extraction-preventing shoulder of the opposite annular guiding portion.

* * * * *